United States Patent [19]

Kurabayashi et al.

[11] Patent Number: 5,439,515
[45] Date of Patent: Aug. 8, 1995

[54] INK, AND INK-JET RECORDING METHOD AND INSTRUMENT USING THE SAME

[75] Inventors: Yutaka Kurabayashi; Makoto Aoki, both of Yokohama; Yoshihisa Takizawa, Kawasaki, all of Japan

[73] Assignee: Canon Kabushiki Kaisha, Tokyo, Japan

[21] Appl. No.: 90,548

[22] Filed: Jul. 13, 1993

[30] Foreign Application Priority Data

Jul. 30, 1992 [JP] Japan .................................. 4-203885
Feb. 22, 1993 [JP] Japan .................................. 5-054593

[51] Int. Cl.⁶ ...................... C09D 11/10; C09D 11/14
[52] U.S. Cl. .............................. 106/20 R; 106/26 R
[58] Field of Search ........................... 106/20 R, 26 R

[56] References Cited

U.S. PATENT DOCUMENTS

| | | | |
|---|---|---|---|
| 3,653,932 | 4/1972 | Berry et al. | 106/22 |
| 3,715,219 | 2/1973 | Kurz et al. | 106/22 |
| 4,390,369 | 6/1983 | Merritt et al. | 106/31 |
| 4,490,731 | 12/1984 | Vaught | 346/140 R |
| 4,768,198 | 11/1988 | Zgambo | 106/20 R |
| 4,798,399 | 12/1988 | Williams et al. | 106/20 R |
| 4,938,801 | 7/1990 | Yoshioka et al. | 106/20 R |
| 4,971,628 | 11/1990 | Loftin | 106/20 R |
| 5,021,802 | 6/1991 | Allred | 106/23 R |
| 5,078,790 | 1/1992 | Tochihara et al. | 106/20 |
| 5,080,716 | 1/1992 | Aoki et al. | 106/20 |
| 5,081,470 | 1/1992 | Kurabayashi et al. | 346/1.1 |
| 5,100,468 | 3/1992 | Yuasa et al. | 106/26 R |
| 5,124,201 | 6/1992 | Kurabayashi et al. | 428/323 |
| 5,131,949 | 7/1992 | Tochihara et al. | 106/20 |
| 5,132,700 | 7/1992 | Tochihara et al. | 346/1.1 |

FOREIGN PATENT DOCUMENTS

| | | |
|---|---|---|
| 0015704 | 9/1980 | European Pat. Off. . |
| 0329026 | 8/1989 | European Pat. Off. . |
| 55-29546 | 3/1980 | Japan . |
| 58-13675 | 1/1983 | Japan . |
| 62-181372 | 8/1987 | Japan . |
| 1272623 | 10/1989 | Japan . |
| 2038088 | 2/1990 | Japan . |
| 2299878 | 12/1990 | Japan . |
| 3172362 | 7/1991 | Japan . |

Primary Examiner—Helene Klemanski
Attorney, Agent, or Firm—Fitzpatrick, Cella, Harper & Scinto

[57] ABSTRACT

Disclosed herein is an ink comprising at least a recording agent, a liquid medium dissolving the recording agent therein and a compound having thermo-reversible gelation property, wherein the ink is in a homogeneous solution system at 25° C., and the compound having thermo-reversible gelation property separates out in the ink solution in a temperature range of from 30° C. to 65° C., so that the ink becomes a dispersion state. An ink-jet recording method and instruments making use of such an ink are also disclosed.

27 Claims, 4 Drawing Sheets

INK, AND INK-JET RECORDING METHOD AND INSTRUMENT USING THE SAME

BACKGROUND OF THE INVENTION

1. Field of the Invention

The present invention relates to an ink, and an ink-jet recording method and instruments making use of the ink. In particular, the present invention relates to an ink which can achieve high-speed, highly fine and high-image quality, full-color recording on non-coated paper such as paper for electrophotography, paper for reporting, notepaper, letter paper, bond paper and continuous business forms, i.e., so-called plain paper, which are commonly used in offices and homes, to say nothing of coated paper specially prepared for ink-jet recording, and an ink-jet recording method and instruments making use of such an ink.

2. Related Background Art

In an image-forming process by an ink-jet recording system, there has been a demand, as one of techniques which have increasingly acquired an importance in recent years, for development of an ink for image recording and an image-forming process which permit highly fine, full-color recording, which is good in color development and free from any feathering or bleeding, even on non-coated paper such as paper for electrophotography, paper for reporting, notepaper, letter paper, bond paper and continuous business forms (these will hereinafter be called "plain paper" collectively), which are commonly used in offices and homes. Many proposals have been made with a view toward achieving such an demand.

For example, Japanese Patent Application Laid-Open No. 55-29546 discloses a process for enhancing the penetrability of an ink into a paper sheet, in which a specific surfactant is added to the ink to lower the surface tension of the ink. It is also disclosed in Japanese Patent Application Laid-Open No. 55-57862 to add a strongly basic substance to an ink so as to chemically dissolve a sizing agent and pulp contained in a paper sheet, thereby controlling the areas of dots and the easiness of absorption.

Further, Japanese Patent Application Laid-Open No. 58-13675 discloses the addition of polyvinylpyrrolidone having a molecular weight of not less than 40,000 to an ink, or Japanese Patent Application Laid-Open No. 3-172362 discloses a method of controlling the areas of dots and the easiness of absorption by adding a specific microemulsion to an ink.

Furthermore, U.S. Pat. Nos. 3,653,932, 3,715,219, 4,390,369 and 4,490,731 separately disclose a solid-liquid phase-change ink, i.e., an ink which is solid at room temperature, but turns liquid at a specified temperature or higher. The phase-change ink of this type is ejected as a liquid and then struck against a recording material to immediately solidify on the surface of the recording material.

As examples of the use of a gel-sol transition ink, inks that are in a gel state at room temperature, but change into a sol state under heat are disclosed in Japanese Patent Application Laid-Open Nos. 62-181372 and 1-272623, etc. As with the solid-liquid phase-change ink, these inks are all intended to change again into the gel state after their impact against recording materials to suppress the running of the inks.

However, the above-mentioned techniques involve such problems as described below.

The method of enhancing the penetrability of an ink by the addition of a surfactant can improve the fixability of the ink, but involves a problem that since a recording agent also penetrates deeply, the color-producing property of the ink is lowered.

The method in which a strongly basic substance is added to an ink is insufficient to solve problems of both running and fixability against paper making use of a certain size, for example, medium-quality paper, and also has a problem of safety for human body.

Further, the mere addition of a polymer or a certain emulsion to an ink fails to exhibit sufficient effects in such a range that recording density of the ink becomes greater upon full-color recording or the like.

Furthermore, the solid-liquid phase-change type ink requires to liquefy the ink upon operation, and hence involves such problems that the ink makes the burden to apparatus such as the temperature control of an ink feed system heavier, and moreover, when the print is exposed to, for example, an extremely high temperature during its storage, the ink remelts, resulting in deformation of printed areas.

As with the solid-liquid phase-change ink, the sol-gel transition ink is also difficult to handle and has a problem of shelf stability in prints.

As described above, various proposals have been made with a view toward improving ink-jet recording properties to plain paper. However, there has not yet been known an ink which has good color-producing property to plain paper, does not cause problems of bleeding and feathering even when impacting at least two inks on the same area, is excellent in fixability, and makes the burden to apparatus light.

SUMMARY OF THE INVENTION

It is accordingly an object of the present invention to provide an ink which has good color-producing property even when recording on plain paper, is excellent in fixability even when impacting a plurality of inks on the same area, can give record images with no ink running or bleeding, and is not liable to cause clogging at the nozzle of a head for ink-jet recording, and hence has excellent reliability, and an ink-jet recording method and instruments making use of such an ink.

The above object can be achieved by the present invention described below. According to the present invention, there is thus provided an ink comprising at least a recording agent, a liquid medium dissolving the recording agent therein and a compound having thermo-reversible gelation property, wherein the ink is in a homogeneous solution system at 25° C., and the compound having thermo-reversible gelation property separates out in the ink solution in a temperature range of from 30° C. to 65° C., so that the ink becomes a dispersion state.

According to the present invention, there is also provided an ink-jet recording method comprising ejecting droplets of an ink out of an orifice in accordance with a recording signal to make a record on a recording material, wherein said ink is the ink described above.

According to the present invention, there is further provided an ink-jet recording method comprising ejecting droplets of an ink out of an orifice in accordance with a recording signal to make a record on a recording material, wherein said ink is the ink described above, and the volume of the ink applied to the recording material is 40 nl/mm² or less.

According to the present invention, there is further provided a recording unit comprising an ink container portion with an ink held therein and a head from which the ink is ejected in the form of ink droplets, wherein said ink is the ink described above.

According to the present invention, there is still further provided an ink cartridge comprising an ink container portion with an ink held therein, wherein said ink is the ink described above.

According to the present invention, there is yet still further provided an ink-jet recording apparatus comprising a recording unit having an ink container portion with an ink held therein and a head from which the ink is ejected in the form of ink droplets, wherein said ink is the ink described above.

According to the present invention, there is yet still further provided an ink-jet recording apparatus comprising a recording head from which an ink is ejected in the form of ink droplets, an ink cartridge having an ink container portion with an ink held therein, and an ink feeder for feeding the ink from the ink cartridge to the recording head, wherein said ink is the ink described above.

DESCRIPTION OF THE PREFERRED EMBODIMENTS

Examples of the compound having thermo-reversible gelation property, which is used in an ink according to the present invention, may include water-soluble cellulose ethers described in, for example, "Collected Papers on Polymers", Vol. 38, p. 133 (1981).

The feature of an aqueous solution of a water-soluble cellulose ether resides in that since the water-soluble cellulose ether has a negative temperature coefficient on solubility, the microgel of the polymer reversibly repeats the separation from an aqueous phase and dissolution in the aqueous phase according to rise and drop in temperature.

Figure 1A:
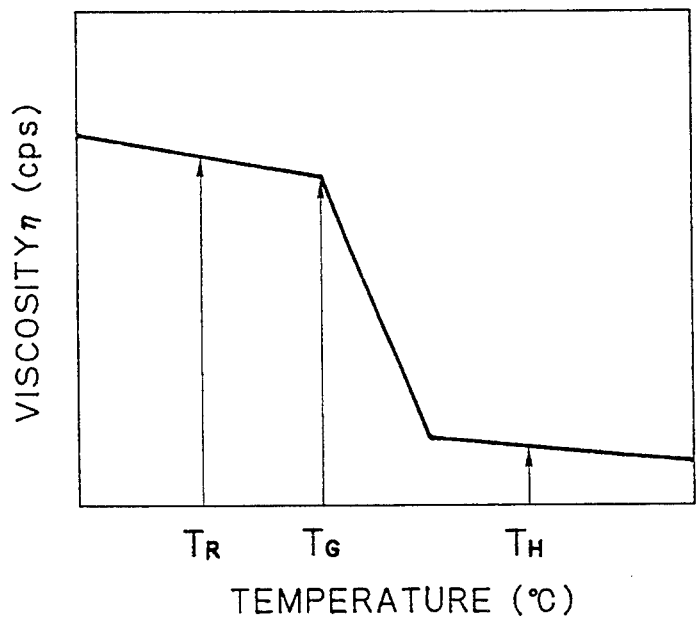
FIGS. 1A and 1B are schematic diagrams illustrating temperature-viscosity curves of inks according to the present invention.

When the microgel separates from the aqueous phase, the viscosity of the aqueous solution rapidly decreases as illustrated in FIG. 1A. More specifically, polymer molecule hydrates in the solution at a low temperature and do not interact on each other except for simple entanglement. However, the polymer molecules undergo dehydration in which water of hydration is released from the molecules as the temperature is raised, resulting in viscosity decrease as a change of solution properties.

Figure 1B:
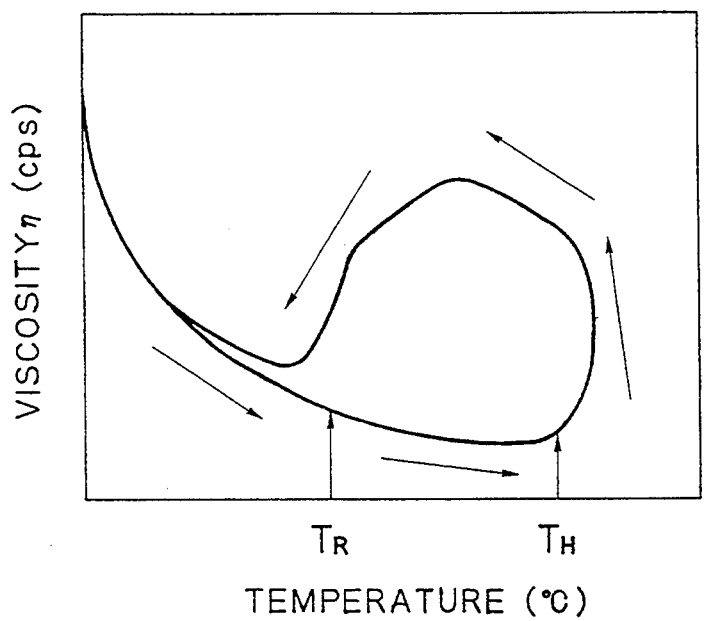

By the way, when the solution is cooled, the process of viscosity change may become hysteresis in some cases depending upon the kind of the thermo-reversibly gelling compound, as illustrated in FIG. 1B.

In an ink according to another embodiment of the present invention, a penetrable solvent is added to the ink. Such a penetrable solvent acts so as to help the ink to penetrate into paper immediately after its impact against the paper, and hence contributes toward imparting high-speed fixability to the ink. Preferably, the penetrable solvent is contained in an amount of from 2 to 20% by weight based on the total weight of the ink. At the same time, the action of the compound having thermo-reversible gelation property allows the ink to increase the viscosity, thereby developing an effect of reducing the penetration speed of the ink. Therefore, the ink is prevented from penetrating too deep into the paper, so that the recording agent as a color material remains in the vicinity of the paper surface, and the color-producing property of the ink is not impaired. In addition, the ink is allowed to suppress not only the penetration in the depth direction but also the spreading in the transverse direction, so that the ink does not bring about the degradation of print quality such as feathering and dot gain.

FIGS. 1A and 1B schematically illustrate the viscosity-temperature curves of typical inks according to the present invention.

In FIG. 1A, the viscosity of the ink at a temperature $T_H$ higher than a transition temperature $T_G$ at which the ink changes from a homogeneous solution system to a dispersion state (hereinafter referred to as "transition temperature to the dispersion state" merely), i.e., gel coagulates and separates from the aqueous phase by the action of the compound having thermo-reversible gelation property, is lower than that of the ink near at room temperature $T_R$.

When ink-jet recording is conducted using the ink according to the present invention, it is preferable that the temperature of a recording head should be preset to $T_H$ in FIG. 1A or 1B to fly out droplets of the ink whose viscosity has decreased. After impacting against paper which is a recording material, the ink thickens back to the original viscosity as its temperature lowers, so that the recording agent in the ink remains in the surface of the paper without penetrating deeply in the paper, and the color-producing property of the ink is hence improved.

In addition, with respect to the transverse spreading of the ink, the running of the ink is prevented owing to this thickening effect, so that printing free of any feathering and sharp in edge can be realized.

For the same reason, bleeding of ink due to color mixing of inks of different colors (hereinafter called merely "bleeding") can be prevented even when full-color images are formed. Furthermore, color ink-jet recording good in fixability can be achieved.

In the present invention, it is preferable to preset the transition temperature to the dispersion state of the ink to a temperature ranging from 30° to 65° C. in that the burden of the apparatus is lightened. If the transition temperature to the dispersion state is preset too high, the evaporation of the ink from the tip of a nozzle tends to occur when the temperature of the head is preset to such a range upon recording. It is not hence preferable to preset the transition temperature to the dispersion state to such a high temperature from the viewpoint of reliability.

In the ink which shows the viscosity change as shown in FIG. 1B, the viscosity change after impact becomes great because its temperature-viscosity curve shows hysteresis as illustrated in FIG. 1B. Therefore, exactly the same effect as described above is developed. Even in this case, full-color images excellent in fixability, good in print quality and free of any bleeding can be obtained without impairing the color-producing property of the recording agents.

Incidentally, the temperature at which the ink changes from the homogeneous solution system to the dispersion state (merely, the transition temperature to the dispersion state) means a temperature at which the compound having thermo-reversible gelation property, which has been hydrated, releases water molecules with temperature increase, so that the compound is reduced in solubility and hence separates out as fine particles from the homogeneous solution of the ink, whereby the ink solution turns a dispersion state. By the way, such change of state in the ink can be confirmed by optical means such as reduction in the transmittance and change in light scattering coefficient of the ink.

The present invention will hereinafter be described in more detail by preferred embodiments.

The ink according to the present invention comprises at least a compound having thermo-reversible gelation property and features that it is in a homogeneous solution system at 25° C. and the compound having thermo-reversible gelation property separates out in the ink solution in a temperature range of from 30° C. to 65° C. so that the ink becomes a dispersion state.

Compounds having thermo-reversible gelation property and used in the ink according to the present invention are mentioned below. However, the compounds according to the present invention are not limited to the following compounds.

Exemplary compounds thereof may include water-soluble cellulose ethers such as hydroxypropyl cellulose, hydroxypropylmethyl cellulose, methyl cellulose and hydroxybutoxy-modified methyl cellulose/hydroxypropylmethyl cellulose, and water-soluble polyvinyl acetal.

The molecular weights of the above-mentioned compounds may suitably be not less than 5 cps, but not more than 10,000 cps as determined in terms of the viscosity of its 2% aqueous solution at 25° C. Any compounds having an extremely high molecular weight are not preferred because the particle sizes of their particles in the dispersion state are difficult to control precisely.

The compounds having thermo-reversible gelation property as described above may be used either singly or in any combination thereof. Their amount contained in the ink may be from 0.01 to 20% by weight, preferably from 0.05 to 10% by weight, more preferably from 0.1 to 5% by weight based on the total weight of the ink though it varies according to the kinds of dyes or pigments, other additives and solvents to be used, and the like.

A component which can bring about a further effect when used in combination with the above-described compound having thermo-reversible gelation property may include a penetrable solvent Which is used for the purpose of improving the fixability of the ink. Therefore, an ink including the penetrable solvent in addition to the above-described compound having thermo-reversible gelation property is an ink according to another preferred embodiment of the present invention.

Examples of the penetrable solvent used in the present invention include monohydric alcohols such as ethyl alcohol, propyl alcohol, isopropyl alcohol, n-butyl alcohol, isobutyl alcohol, n-pentyl alcohol, cyclohexanol and benzyl alcohol, and other polyhydric alcohols and alkyl ethers thereof. Specific examples thereof may include 1,7-heptanediol, tripropylene glycol, hexylene glycol, dipropylene glycol monomethyl ether, tripropylene glycol monomethyl ether and triethylene glycol monobutyl ether. However, the penetrable solvents are not limited to these compounds.

If the penetrable solvent as described above is used in a large amount, the shape of a single dot itself is not deformed owing to the effect of the thermo-reversibly gelling compound, resulting in a print sharp in edge.

Examples of the recording agents usable in the ink according to the present invention may include direct dyes, acid dyes, food colors, basic dyes, reactive dyes, disperse dyes, vat dyes, soluble vat dyes, reactive disperse dyes, oil colors and various pigments.

The content of these recording agents may be determined depending upon the kinds of the liquid medium components, properties required of the ink, and the like. However, they may be generally used in a proportion of from about 0.2 to 20% by weight, preferably from 0.5 to 10% by weight, more preferably from 1 to 5% by weight, based on the total weight of the ink.

Examples of the organic solvents usable in the ink according to the present invention may include alcohols such as methyl alcohol, ethyl alcohol, n-propyl alcohol, isopropyl alcohol, n-butyl alcohol, sec-butyl alcohol, tert-butyl alcohol, isobutyl alcohol, n-pentanol and cyclohexanol; amides such as dimethylformamide and dimethylacetamide; ketones and keto-alcohols such as acetone and diacetone alcohol; ethers such as tetrahydrofuran and dioxane; addition polymers of oxyethylene or oxypropylene with diethylene glycol, triethylene glycol, tetraethylene glycol, dipropylene glycol, tripropylene glycol, polyethylene glycol, polypropylene glycol and the like; alkylene glycols such as ethylene glycol, propylene glycol, trimethylene glycol, butylene glycol and hexylene glycol; thioglycol; glycerol; 1,2,6-hexanetriol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; sulfolane; N-methyl-2-pyrrolidone; and 1,3-dimethyl-2-imidazolidinone.

The content of the above-mentioned organic solvents is generally within a range of from 1 to 50% by weight, preferably from 2 to 30% by weight based on the total weight of the ink.

Since the transition temperature to the dispersion state of the ink according to the present invention varies according to the kind and amount of a solvent used, one pays attention to the consideration of the solvent composition like the characteristics of the compound having thermo-reversible gelation property.

The organic solvents as described above may be used either singly or in any combination thereof. However, the most preferred composition of the liquid medium is a mixed solvent comprising water and at least one organic solvent, and containing at least one water-soluble, high-boiling solvent, for example, a polyhydric alcohol such as diethylene glycol, triethylene glycol or glycerol.

Although the principal components which constitute the inks according to the present invention are as described above, the inks may contain, as needed, a variety of other additives such as a dispersant, a surfactant, a viscosity modifier, a surface tension modifier, an optical whitening agent, an antioxidant, a mildewproofing agent and a pH adjustor within limits not impeding the achievement of the object of the present invention.

The surfactant is added with a view toward improving the fixability of the ink like the above-described penetrable solvent. No particular limitation is imposed on the chemical structure of the surfactant used in the present invention. It is however preferable that the surface tension of its aqueous solution in a CMC (critical micelle concentration) should be not less than 10 dyn/cm, but not more than 40 dyn/cm.

The content of the surfactant in the ink is not less than 0.02% by weight, but not more than 10% by weight, and may be within a range by which the fixability and color-producing property are well balanced with each other.

In the present invention, it is also possible to add various kinds of salts and the like to the ink with a view toward controlling the transition temperature to the dispersion state of the compound having thermo-reversible gelation property.

The inks according to the present invention may suitably be used in all the ink-jet recording systems commonly used, but are particularly suitable for use in an ink-jet recording system of a type that an ink is ejected by the bubbling phenomenon of the ink caused by thermal energy.

When the physical properties of the inks according to the present invention upon both unoperation and operation (ejection) are controlled, it is preferable to consider the matching (jetting property, reliability, etc.) with an ink-jet recording head to be used together with the printability to plain paper, which is an principal object of the present invention.

In a case where an ink of the type that the viscosity characteristics of the ink depending on the temperature are indicated by FIG. 1A is used, the ink may desirably be adjusted so as to give a viscosity ranging from 5 to 500 cps, preferably from 10 to 100 cps at 25° C., and a surface tension ranging from 25 to 68 dyn/cm at 25° C. as preferable physical properties upon unoperation.

When a temperature upon operation (the temperature indicated by $T_H$ in FIG. 1A) is preset, it is preferable to preset it to a temperature higher than the transition temperature to the dispersion state (the temperature indicated by $T_G$ in FIG. 1A) by 2° C. to 40° C. The operation temperature may desirably be adjusted to a range of from 30° C. to 65° C., preferably from 35° C. to 45° C.

The transition temperature to the dispersion state may be controlled by selecting the kind, molecular weight and amount of the compound having thermo-reversible gelation property to be used. It is also possible to control it by selecting the kind and amount of the organic solvent to be used, or adding a suitable inorganic salt.

The ink may desirably have a viscosity ranging from 0.5 to 5 cps, preferably from 0.5 to 3 cps, and a surface tension ranging from 25 to 68 dyn/cm as preferable physical properties upon operation.

In a case where an ink of the type that the viscosity characteristics of the ink depending on the temperature are indicated by FIG. 1B is used, it is not necessary to make a difference between viscosities of the ink at operation and unoperation temperatures as great as the ink of the type shown in FIG. 1A. Its viscosity may desirably fall within a range of from about 0.5 to 20 cps, preferably from 0.8 to 10 cps, more preferably from 1 to 5 cps in a temperature range of from 25° C. to the operation temperature.

Figure 2:
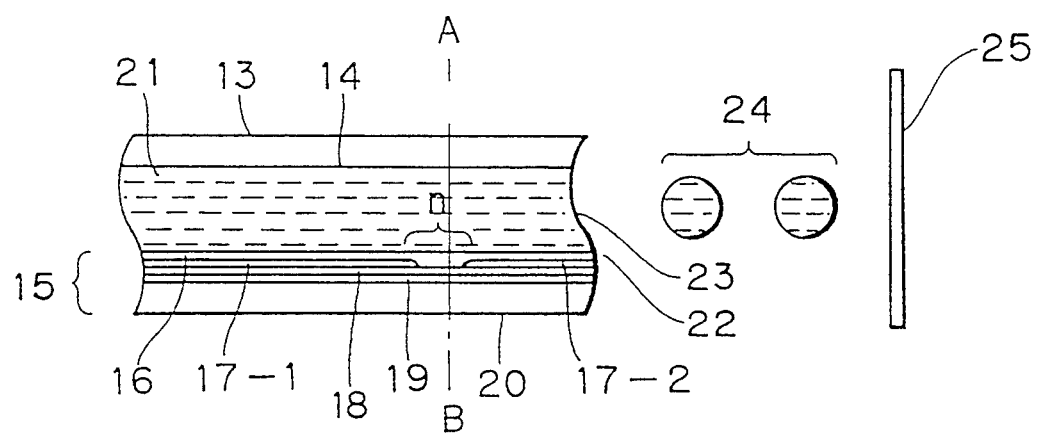
FIG. 2 is a longitudinal cross-sectional view of a head of an ink-jet recording apparatus.
Figure 3:
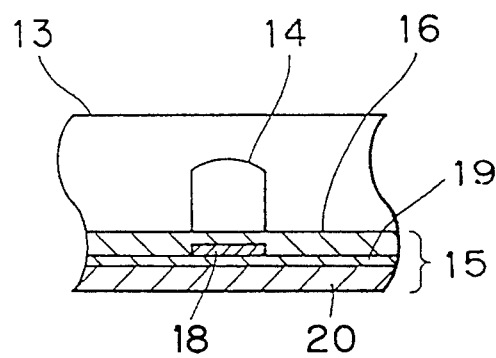
FIG. 3 is a transverse cross-sectional view of the head of the ink-jet recording apparatus.
Figure 4:
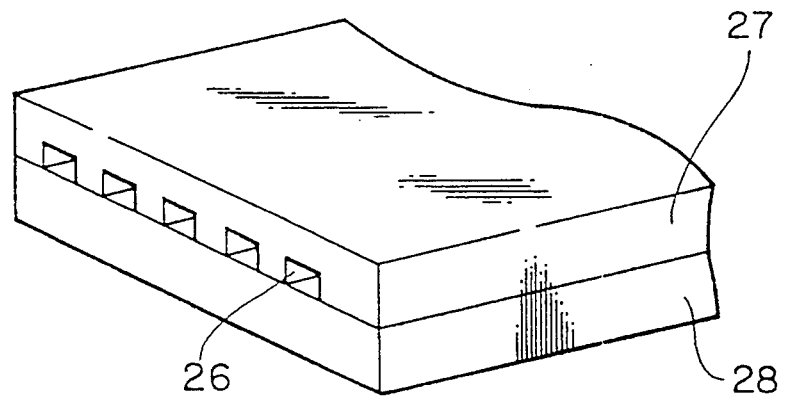
FIG. 4 is a perspective view of the appearance of a multi-head which is an array of such heads as shown in FIG. 2.

An illustrative example of an ink-jet recording apparatus of this invention, which is suitable for use in conducting recording using the above-described inks according to the present invention, will hereinafter be described. Examples of the construction of a head, which is a main component of such an apparatus, are illustrated in FIGS. 2, 3 and 4.

A head 13 is composed of a glass, ceramic or plastic plate or the like having an ink-passing channel 14 and a heating head 15, which is used for thermal recording (the drawing shows a head to which, however, is not limited), said heating head 15 being bonded to the plate. The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice 22 (a minute opening) and forms a meniscus 23 owing to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording material 25 in the form of recording droplets 24.

FIG. 4 illustrates an appearance of a multi-head composed of an array of a number of heads as shown in FIG. 2. The multi-head is formed by closely bonding a glass plate 27 having a number of channels 26 to a heating head 28 similar to the head as illustrated in FIG. 2.

Incidentally, FIG. 2 is a cross-sectional view of the head 13 taken along the flow path of the ink, and FIG. 3 is a cross-sectional view taken along line A–B in FIG. 2.

In order to maintain an ink of this invention at its operation temperature (a temperature of the head temperature-controlled upon recording), it is only necessary to take a measure of, for example, heating the substrate 20 to regulate the whole head to a fixed temperature.

The viscosity of the ink held to the operation temperature in the above-described manner becomes lower than that upon unoperation owing to the action of the compound having thermo-reversible gelation property, whereby the ejecting behavior of the ink from the head is sufficiently enhanced.

Figure 5:
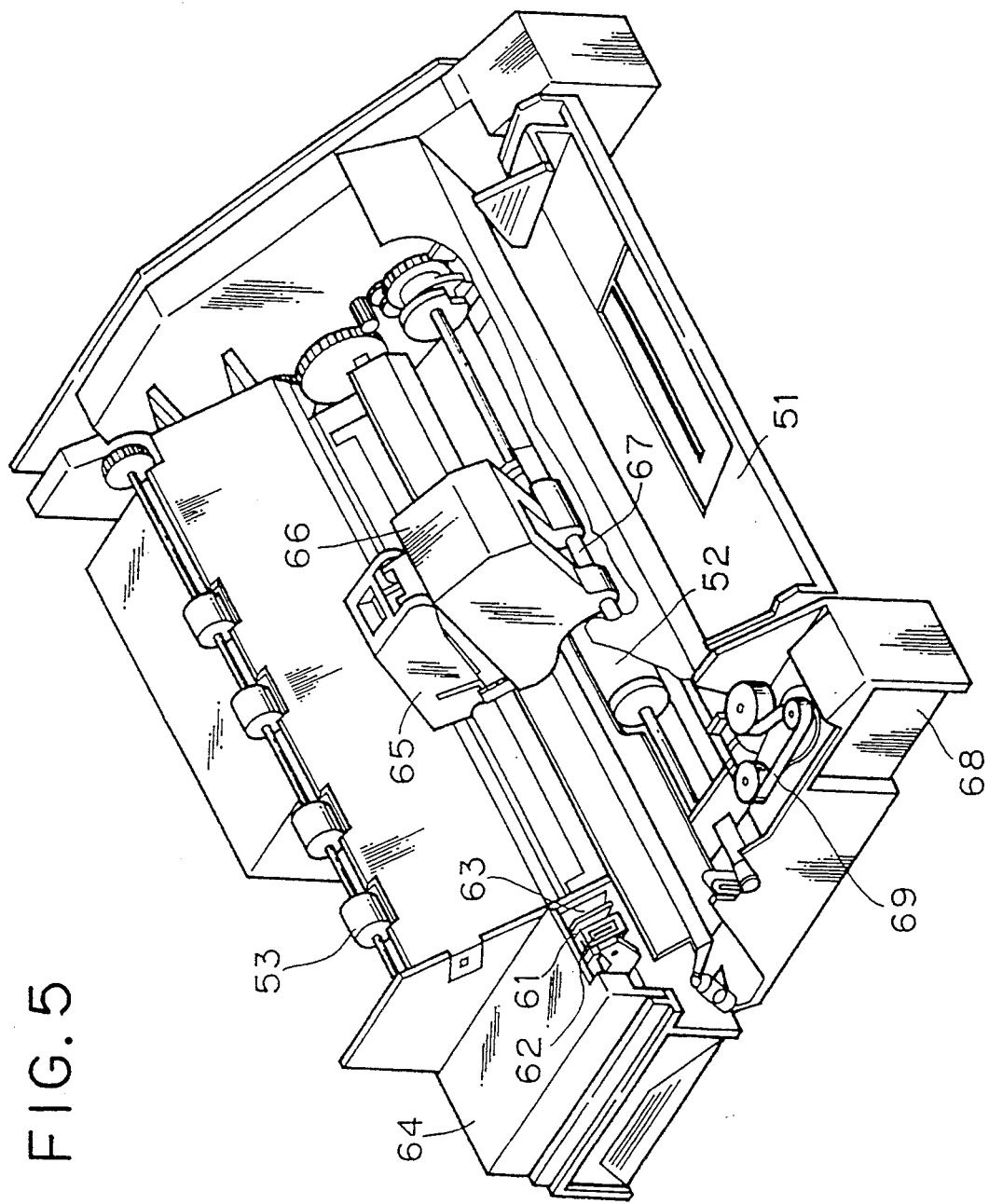
FIG. 5 is a perspective view of an illustrative ink-jet recording apparatus.

FIG. 5 illustrates an example of an ink-jet recording apparatus in which such a head has been incorporated. In FIG. 5, reference numeral 61 designates a blade serving as a wiping member, one end of which is a stationary end held by a blade-holding member to form a cantilever. The blade 61 is provided at the position adjacent to the region in which a recording head operates, and in this embodiment, is held in such a form that it protrudes to the course through which the recording head is moved.

Reference numeral 62 indicates a cap, which is provided at the home position adjacent to the blade 61, and is so constituted that it moves in the direction perpendicular to the direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved.

The above-described blade 61, cap 62 and absorbing member 63 constitute a recovery portion 64 for the recording head, where the blade 61 and absorbing member 63 remove off water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved.

The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 6:
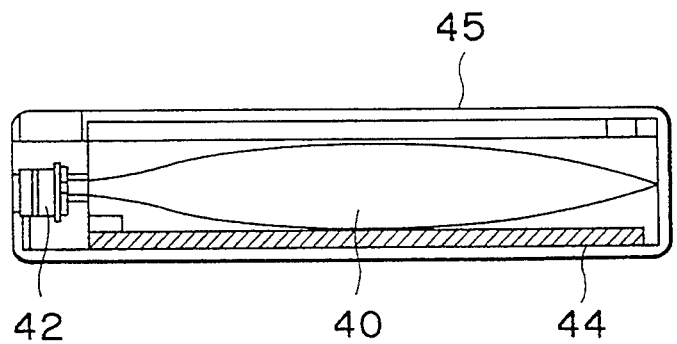
FIG. 6 is a longitudinal cross section of an illustrative ink cartridge.

FIG. 6 illustrates an exemplary ink cartridge in which an ink fed to the head through an ink-feeding member, for example, a tube is contained.

Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink.

It is preferred in this invention that the ink container portion is formed of a polyolefin, in particular, polyethylene, at its surface with which the ink comes into contact.

The ink-jet recording apparatus used in this invention may not be limited to the apparatus as described above in which the head and the ink cartridge are separately provided. Therefore, a device in which these members are integrally formed as shown in FIG. 7 can also be preferably used.

Figure 7:
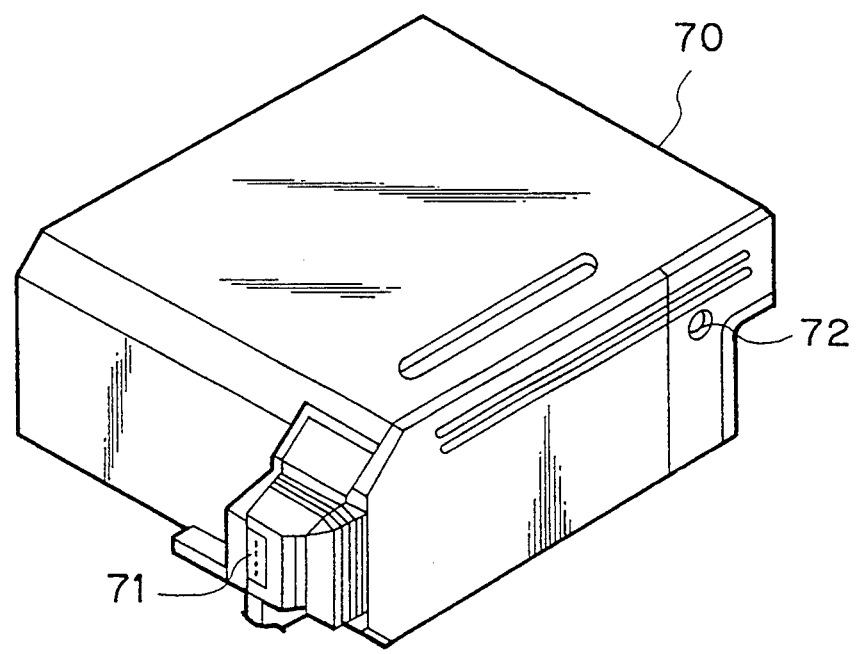
FIG. 7 is a perspective view of a recording unit.

In FIG. 7, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices.

In this invention, polyurethane, cellulose or polyvinyl acetal is preferably used as a material for the ink-absorbing member. Reference numeral 72 indicates an air passage for communicating the interior of the recording unit 70 with the atmosphere. This recording unit 70 can be used in place of the recording head shown in FIG. 4, and is detachably installed on the carriage 66.

The present invention will hereinafter be described more specifically by the following Examples and Comparative Examples.

Examples 1 to 4 and Comparative Examples 1 to 4

Water-soluble cellulose ethers shown in Table 1 were provided as compounds having thermo-reversible gelation property. With respect to these compounds, the molecular weights or polymerization degrees or viscosities of their 2% aqueous solutions at 20° C., degrees of substitution with —OCH$_3$, M (%), degrees of substitution with —OC$_3$H$_5$OH, HP (%), and temperatures, T$_G$ at which the viscosities of the respective aqueous solutions start sharply decreasing owing to gelation under heat are set forth collectively in Table 1.

TABLE 1

| No. | Name of Compound | Trade name | $\eta$ (cps) | M (%) | HP (%) | T$_G$ (°C.) |
|---|---|---|---|---|---|---|
| A | Hydroxypropyl-methyl cellulose | Metholose*[1] 90SH-8000 | 8000 | 30 | 10 | 55 |
| B | Hydroxypropyl cellulose | HPC-MF*[2] | 9000 | — | 65 | 47 |
| C | Hydroxypropyl cellulose | HPC-M*[3] | 260 | — | 65 | 45 |
| D | Hydroxypropyl cellulose | HPC-S*[4] | 8 | — | 65 | 45 |

(Note)
*[1]: Product of Shin-Etsu Chemical Co., Ltd.
*[2]: Product of Shin-Etsu Chemical Co., Ltd.
*[3]: Product of Nippon Soda Co., Ltd.
*[4]: Product of Nippon Soda Co., Ltd.
$\eta$: Viscosity of each 2% aqueous solution at 20° C.
T$_G$: Gelation temperature of the 2% aqueous solution.

Inks according to the present invention were prepared by separately using the above-described compounds having thermo-reversible gelation property and mixing their corresponding components, which will be described subsequently, with them.

As the first step of the procedure for the preparation of the respective inks, an aqueous solution of each water-soluble cellulose ether selected from the above-mentioned compounds was prepared in a proper concentration (20% by weight or lower).

To a portion of the aqueous solution of the water-soluble cellulose ether, predetermined amounts of water, an organic solvent(s) and a dye, and optionally a surfactant were then added in that order so as to control the concentration of the water-soluble cellulose ether to a desired level. The resulting mixture was stirred for 5 hours and then filtered under pressure through a membrane filter (Fluoropore Filter, trade name; product of Sumitomo Electric Industries, Ltd.) having a pore size of 0.22 μm, thereby obtaining Inks 1 through 4 of black, yellow, magenta and cyan colors in each of Examples 1 to 4.

Ink compositions of the four inks of different colors are shown in Tables 2 to 5, respectively. In each table, numerals indicate the amounts (% by weight based on the total weight of the ink) of the respective components added.

TABLE 2

Compositions of black inks according to Examples 1 to 4

| Component of ink | Example 1 | 2 | 3 | 4 |
| --- | --- | --- | --- | --- |
| C.I. Food Black 2 | 3.0 | 3.0 | 3.0 | 3.0 |
| Diethylene glycol | 7.5 | 10.0 | 10.0 | 10.0 |
| Isopropyl alcohol | — | — | — | 2.5 |
| Surfactant (*) | 0.8 | 0.3 | 0.1 | 0.05 |
| Thermo-gelling compound | A | B | C | D |
| Amount of thermo-gelling compound added | 0.5 | 0.5 | 0.5 | 1.5 |
| Water | 88.2 | 86.2 | 86.4 | 83.0 |

(*): Acetylenol-EH, product of Kawaken Fine Chemicals Co., Ltd. The same surfactant was used in all Examples 1 to 4.

TABLE 3

Compositions of yellow inks according to Examples 1 to 4

| Component of ink | Example 1 | 2 | 3 | 4 |
| --- | --- | --- | --- | --- |
| C.I. Direct Yellow 86 | 2.0 | 2.0 | 2.0 | 2.0 |
| Diethylene glycol | 7.5 | 10.0 | 10.0 | 10.0 |
| Isopropyl alcohol | — | — | — | 2.5 |
| Surfactant (*) | 0.8 | 0.3 | 0.1 | 0.05 |
| Thermo-gelling compound | A | B | C | D |
| Amount of thermo-gelling compound added | 0.5 | 0.5 | 0.5 | 1.5 |
| Water | 89.2 | 87.2 | 87.4 | 83.8 |

TABLE 4

Compositions of magenta inks according to Examples 1 to 4

| Component of ink | Example 1 | 2 | 3 | 4 |
| --- | --- | --- | --- | --- |
| C.I. Acid Red 35 | 2.5 | 2.5 | 2.5 | 2.5 |
| Diethylene glycol | 7.5 | 10.0 | 10.0 | 10.0 |
| Isopropyl alcohol | — | — | — | 2.5 |
| Surfactant (*) | 0.8 | 0.3 | 0.1 | 0.05 |
| Thermo-gelling compound | A | B | C | D |
| Amount of thermo-gelling compound added | 0.5 | 0.5 | 0.5 | 1.5 |

TABLE 4-continued

Compositions of magenta inks according to Examples 1 to 4

| Component of ink | Example 1 | 2 | 3 | 4 |
| --- | --- | --- | --- | --- |
| Water | 88.7 | 86.7 | 86.9 | 83.5 |

TABLE 5

Compositions of cyan inks according to Examples 1 to 4

| Component of ink | Example 1 | 2 | 3 | 4 |
| --- | --- | --- | --- | --- |
| C.I. Direct Blue 199 | 3.0 | 3.0 | 3.0 | 3.0 |
| Diethylene glycol | 7.5 | 10.0 | 10.0 | 10.0 |
| Isopropyl alcohol | — | — | — | 2.5 |
| Surfactant (*) | 0.8 | 0.3 | 0.1 | 0.05 |
| Thermo-gelling compound | A | B | C | D |
| Amount of thermo-gelling compound added | 0.5 | 0.5 | 0.5 | 1.5 |
| Water | 88.2 | 86.2 | 86.4 | 83.0 |

For the sake of comparison, inks having the same compositions as those of the inks in the respective examples except that any water-soluble cellulose ether according to this invention was not used were prepared as inks of Comparative Examples 1 to 4. In each of these inks, the water-soluble cellulose ether was replaced by water.

Example 5

Inorganic salt-containing inks of the respective colors according to the present invention were prepared, which contained the same hydroxypropylmethyl cellulose as used in Example 1, and were composed of components shown in the following Table 6.

TABLE 6

| Component of ink | Example 5 |
| --- | --- |
| Dye | The same concentration as the dye of the corresponding color in Example 1 |
| Diethylene glycol | 7.5 |
| Propylene glycol | 7.5 |
| Isopropyl alcohol | 5.0 |
| Surfactant | 0.8 |
| Thermo-gelling compound | A |
| Amount of thermo-gelling compound added | 1.5 |
| Sodium carbonate | 0.075 |
| Water | Balance |

Viscosities at 25° C., $\eta$ (25° C.), operation temperatures, $T_H$ and viscosities at operation temperature, $\eta$ ($T_H$) of the inks according to the respective examples are shown in Table 7.

TABLE 7

| Example | $\eta$ (25° C.) | $\eta$ ($T_H$) | $T_H$ (°C.) |
| --- | --- | --- | --- |
| 1 | 300 | 5.0 | 60 |
| 2 | 20 | 2.5 | 50 |
| 3 | 15 | 2.8 | 60 |
| 4 | 7.5 | 1.5 | 60 |
| 5 | 280 | 4.8 | 45 |

Incidentally, the unit of $\eta$ is cps.

An ink-jet printer in which 4 thermal ink-jet recording heads each having 256 nozzles in 400 dpi were aligned in a main scanning direction was provided, and the respective inks of Examples 1 to 5 and Comparative Examples 1 to 4, which had been prepared in the above-described manner, were charged in their corresponding recording heads through respective ink-feeding tubes.

The recording heads were then heated to and maintained at the operation temperature, $T_H$ of ink corresponding to the inks obtained in each example, thereby conducting ink-jet recording on commercially-available paper for electrophotography. The ink-jetting density of a full-solid printed area is 10 nl/mm² in each color.

With respect to the resultant print samples, various properties, i.e., color-producing property, fixability and resistance to ink bleeding were determined in accordance with the following respective methods. The results of the evaluation as to the three properties are shown in Tables 8 and 9.

(1) Fixability

Blue-color solid printing (overlapping solid printing of cyan and magenta inks at 100% duty) was conducted on commercially-available paper for electrophotography. After 10 seconds, 20 seconds and 30 seconds, the printed area was rubbed with filter paper (No. 5 C, trade name; product of Toyo Filter Paper K.K.) to evaluate the fixability in accordance with the following standard:

A: No rubbing out occurred after 10 seconds;
B: Slight rubbing out occurred after 10 seconds, but no rubbing out after 20 seconds;
C: Slight rubbing out occurred after 20 seconds, but no rubbing out after 30 second;
D: Rubbing out occurred even after 30 seconds.

(2) Color-producing property

The reflection density of a 100% solid-printed area as to each color ink was measured using a Macbeth RD-918 reflection densitometer to use its value as an index of the evaluation of the color-producing property.

(3) Resistance to ink bleeding

Characters were printed with each black ink, and a 100% duty solid printing was conducted with its corresponding yellow ink on the character print, thereby evaluating the print quality of the characters and ranking it in accordance with the following standard. The rank of B or higher is a level practicable without problems.

A: No bleeding occurred;
B: No bleeding occurred, but slight feathering occurred about the characters;
C: Bleeding occurred, and the contours of the characters somewhat deformed;
D: Bleeding occurred to an undue extent, and so the characters could not be read at all.

TABLE 8

| Ex. | OD (BK) | OD (Y) | OD (M) | OD (C) | Fixability | Resistance to ink bleeding |
|---|---|---|---|---|---|---|
| 1 | 1.22 | 1.07 | 1.24 | 1.03 | B | A |
| 2 | 1.17 | 1.02 | 1.14 | 0.94 | A | A |
| 3 | 1.15 | 1.00 | 1.16 | 0.95 | A | B |
| 4 | 1.18 | 1.03 | 1.17 | 0.98 | A | B |
| 5 | 1.20 | 1.05 | 1.20 | 1.00 | B | A |

TABLE 9

| Comp. Ex. | OD (BK) | OD (Y) | OD (M) | OD (C) | Fixability | Resistance to ink bleeding |
|---|---|---|---|---|---|---|
| 1 | 1.05 | 0.80 | 1.08 | 0.82 | A | A |
| 2 | 1.08 | 0.84 | 1.10 | 0.83 | A | B |
| 3 | 1.10 | 0.84 | 1.12 | 0.85 | A | C |
| 4 | 1.10 | 0.86 | 1.14 | 0.86 | A | D |

As apparent from the results of the evaluation making use of the inks of Examples 1 to 5 and Comparative Examples 1 to 4, which have been shown above in Tables 8 and 9, the present invention was able to provide recorded images good in printability on plain paper. However, none of the comparative examples were able to provide recorded images satisfying all of the color-producing property, resistance to ink bleeding and fixability.

The inks of Example 5, which contained the inorganic salt, made it possible to lower the operation temperature, $T_H$ owing to the addition of the inorganic salt as shown in Table 7. In addition, both print quality and fixability were identical with those of Example 1 as described in Table 8.

The inks of Examples 1 to 5 according to the present invention are of a type that a temperature-viscosity curve of ink is illustrated in FIG. 1A.

The present invention will then be described in more detail by examples making use of inks of a type that a temperature-viscosity curve of ink is illustrated in FIG. 1B.

Examples 6 to 8 and Comparative Examples 5 to 7

Compounds having thermo-reversible gelation property used in Examples 6 to 8, and viscosities of these compounds are shown in Table 10.

TABLE 10

| Compound No. | Thermo-reversibly gelling compound | Trade name and producer | η* (cps) |
|---|---|---|---|
| F | Polyvinyl acetal | S-lec KW-1, product of Sekisui Chemical Co., Ltd. | 200 |
| G | Methyl cellulose | Methocell A-15C, product of Dow Chemical Japan Ltd. | 1500 |
| H | Hydroxybutyl-methyl cellulose | Methocell HB, product of Dow Chemical Japan Ltd. | 100 |

*: A value determined on a 2% aqueous solution at 25° C.

Their corresponding components shown in Table 11 were mixed in the same manner as in Examples 1 to 5 to obtain black inks according to Examples 6 to 8. In Table 11, numerals indicate % by weight of the respective components based on the total weight of the ink.

TABLE 11

| | Compositional ratio | | |
|---|---|---|---|
| Component of ink | Ex. 6 | Ex. 7 | Ex. 8 |
| C.I. Food Black 2 | 3.0 | 3.0 | 3.0 |
| Diethylene glycol | 8.0 | 8.0 | 8.0 |
| Thermo-reversibly gelling compound shown in Table 10 | F | G | H |
| Amount of thermo-reversibly gelling compound added | 0.5 | 2.0 | 2.5 |
| Water | Balance | Balance | Balance |

Yellow inks according to Examples 6 to 8 were obtained in the same manner as in Examples 1 to 5 by preparing the same compositions as in Table 11 except that 2% by weight of C.I. Direct Yellow 86 was used in place of 3.0% by weight of C.I. Food Black 2.

Magenta inks according to Examples 6 to 8 were obtained in the same manner as in Examples 1 to 5 by preparing the same compositions as in Table 11 except that 2.5% by weight of C.I. Acid Red 35 was used in place of 3.0% by weight of C.I. Food Black 2.

Cyan inks according to Examples 6 to 8 were obtained in the same manner as in Examples 1 to 5 by preparing the same compositions as in Table 11 except that 3.0% by weight of C.I. Direct Blue 199 was used in place of 3.0% by weight of C.I. Food Black 2.

For the sake of comparison, inks in which the thermo-reversibly gelling compound (the compound shown in Table 10) was omitted from the composition in each of the inks according to Examples 6 to 8, and water was supplied instead were prepared as inks of Comparative Examples 5 to 7.

Viscosities at 25° C., $\eta$ (25° C.), operation temperatures, $T_H$ and viscosities at operation temperature, $\eta$ ($T_H$) of the respective inks according to Examples 6 to 8 are shown in Table 12.

TABLE 12

| Example | $\eta$ (25° C.) | $\eta$ ($T_H$) | $T_H$ (°C.) |
|---|---|---|---|
| 6 | 3.0 | 1.5 | 50 |
| 7 | 4.0 | 2.0 | 45 |
| 8 | 4.5 | 2.3 | 45 |

Using the respective inks according to Example 6 to 8, ink-jet recording was conducted in the same manner as in Examples 1 to 5. With respect to the resultant print samples, the color-producing property, fixability and resistance to ink bleeding were evaluated in the same manner as in Examples 1 to 5.

The results of the evaluation as to the three properties are shown in Table 13.

TABLE 13

| Ink used | OD (BK) | OD (Y) | OD (M) | OD (C) | Fixability | Resistance to ink bleeding |
|---|---|---|---|---|---|---|
| Ex. 6 | 1.23 | 1.05 | 1.24 | 1.10 | B | B |
| Ex. 7 | 1.22 | 1.04 | 1.25 | 1.08 | B | B |
| Ex. 8 | 1.21 | 1.03 | 1.23 | 1.07 | B | B |
| Comp. Ex. 5 | 1.20 | 1.00 | 1.20 | 1.05 | B | D |
| Comp. Ex. 6 | 1.15 | 0.97 | 1.15 | 1.08 | B | D |
| Comp. Ex. 7 | 1.15 | 0.95 | 1.18 | 1.06 | B | D |

As apparent from the results shown above in Table 13, the present invention can provide recorded images good in printability on plain paper compared with the case making use of the inks of the comparative examples. In particular, the use of the inks according to the present invention can allow the color-producing property to more enhance without impairing printability such as fixability and resistance to bleeding compared with the case making use of the inks of the comparative examples.

Examples 9 to 12

Black inks according to Examples 9 to 12 were prepared in the same manner as in Examples 1 to 5 by using the thermo-reversibly gelling compound indicated by F in Table 10 and mixing their corresponding components shown in the following Table 14.

TABLE 14

| | Compositional ratio | | | |
|---|---|---|---|---|
| Component of ink | Ex. 9 | Ex. 10 | Ex. 11 | Ex. 12 |
| C.I. Food Black 2 | 3.0 | 3.0 | 3.0 | 3.0 |
| Compound indicated by F in Table 10 | 1.0 | 1.0 | 1.0 | 1.0 |
| Penetrable solvent | 1,7-Hepanediol | TEGMB | PGMM | Hexylene glycol |
| % by weight of penetrable solvent | 10.0 | 10.0 | 10.0 | 10.0 |

TABLE 14-continued

| | Compositional ratio | | | |
|---|---|---|---|---|
| Component of ink | Ex. 9 | Ex. 10 | Ex. 11 | Ex. 12 |
| Water | Balance | Balance | Balance | Balance |

(Note)
TEGMB: Triethylene glycol monobutyl ether.
PGMM: Propylene glycol monomethyl ether.

Yellow inks according to Examples 9 to 12 were obtained in the same manner as in Examples 1 to 5 by preparing the same compositions as in Table 14 except that 2% by weight of C.I. Direct Yellow 86 was used in place of 3.0% by weight of C.I. Food Black 2.

Magenta inks according to Examples 9 to 12 were obtained in the same manner as in Examples 1 to 5 by preparing the same compositions as in Table 14 except that 2.5% by weight of C.I. Acid Red 35 was used in place of 3.0% by weight of C.I. Food Black 2.

Cyan inks according to Examples 9 to 12 were obtained in the same manner as in Examples 1 to 5 by preparing the same compositions as in Table 14 except that 3.0% by weight of C.I. Direct Blue 199 was used in place of 3.0% by weight of C.I. Food Black 2.

Using the respective inks according to Examples 9 to 12, the same color ink-jet recording as in Examples 1 to 8 was conducted by presetting the operation temperature of the recording head to 50° C. in the same manner as in Examples 1 to 5. With respect to the resultant print samples, the color-producing property, fixability and resistance to ink bleeding were evaluated in the same manner as in Examples 1 to 8.

The results of the evaluation as to the three properties are shown in Table 15.

TABLE 15

| Ink used | OD (BK) | OD (Y) | OD (M) | OD (C) | Fixability | Resistance to ink bleeding |
|---|---|---|---|---|---|---|
| Ex. 9 | 1.20 | 1.05 | 1.25 | 1.10 | B | B |
| Ex. 10 | 1.18 | 1.04 | 1.24 | 1.08 | B | B |
| Ex. 11 | 1.17 | 1.03 | 1.23 | 1.09 | B | B |
| Ex. 12 | 1.19 | 1.06 | 1.25 | 1.08 | B | B |

As apparent from the results shown in the above table, the inks and ink-jet recording method according to the present invention can provide recorded images good in printability on plain paper. More specifically, the color-producing property can be more improved without impairing printability such as fixability and resistance to bleeding due to color mixing between color inks.

According to the inks and the ink-jet recording methods making use of these inks, as described above, there can be provided prints free of any bleeding or feathering even when multi- or full-color recording is conducted, excellent in fixability and good in color-producing property.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. An ink comprising at least a recording agent, a liquid medium dissolving the recording agent therein and a compound having thermo-reversible gelation property, wherein the ink is in a homogeneous solution system at 25° C., and the compound having thermo-reversible gelation property separates out in the ink solution in a temperature range of from 30° C. to 65° C., so that the ink becomes a dispersion state.

2. The ink according to claim 1, wherein the compound having thermo-reversible gelation property is contained in an amount of from 0.01 to 20% by weight based on the total weight of the ink.

3. The ink according to claim 1, wherein the compound having thermo-reversible gelation property is water-soluble methyl cellulose.

4. The ink according to claim 1, further comprising at least a penetrable solvent.

5. The ink according to claim 4, wherein the penetrable solvent is contained in an amount of from 2 to 20% by weight based on the total weight of the ink.

6. The ink according to claim 4, wherein the penetrable solvent comprises at least one selected from the group consisting of monohydric alcohols, polyhydric alcohols and alkyl ethers of polyhydric alcohols.

7. An ink-jet recording method comprising ejecting droplets of an ink out of an orifice in accordance with a recording signal to make a record on a recording material, wherein said ink is the ink as set forth in claim 1.

8. The ink-jet recording method according to claim 7, which comprises heating a recording head upon recording to raise the temperature of the ink.

9. The ink-jet recording method according to claim 8, wherein the temperature of the recording head upon recording is preset to a transition temperature at which the compound having thermo-reversible gelation property separates out in the ink solution, so that the ink becomes a dispersion state, or higher.

10. The ink-jet recording method according to claim 9, wherein the temperature of the recording head upon recording is preset to a temperature ranging from 30° C. to 65° C.

11. The ink-jet recording method according to claim 7, wherein the recording material is a non-coated paper sheet.

12. The ink-jet recording method according to claim 7, which comprises applying thermal energy to the ink to eject ink droplets.

13. An ink-jet recording method comprising ejecting droplets of an ink out of an orifice in accordance with a recording signal to make a record on a recording material, wherein said ink is the ink as set forth in claim 1, and the volume of the ink applied to the recording material is 40 nl/mm² or less.

14. The ink-jet recording method according to claim 13, which comprises heating a recording head upon recording to raise the temperature of the ink.

15. The ink-jet recording method according to claim 13, wherein the temperature of the recording head upon recording is preset to a transition temperature at which the compound having thermo-reversible gelation property separates out in the ink solution, so that the ink becomes a dispersion state, or higher.

16. The ink-jet recording method according to claim 13, wherein the temperature of the recording head upon recording is preset to a temperature ranging from 30° C. to 65° C., thereby conducting recording.

17. The ink-jet recording method according to claim 13, wherein the recording material is a non-coated paper sheet.

18. The ink-jet recording method according to claim 13, wherein the ink droplets are formed by applying thermal energy to the ink.

19. A recording unit equipped with an ink container part containing an ink therein and a head for ejecting the ink as its droplets, wherein said ink is the ink as set forth in claim 1.

20. The recording unit according to claim 19, wherein the head comprises a head which causes thermal energy to act on the ink to eject its droplets.

21. An ink cartridge equipped with an ink container part containing an ink therein, wherein said ink is the ink as set forth in claim 1.

22. An ink-jet recording apparatus comprising a recording unit having an ink container portion with an ink held therein and a head from which the ink is ejected in the form of ink droplets, wherein said ink is the ink as set forth in claim 1.

23. The ink-jet recording apparatus according to claim 22, wherein the head comprises a head which causes thermal energy to act on the ink to eject its droplets.

24. An ink-jet recording apparatus comprising a recording head from which an ink is ejected in the form of ink droplets, an ink cartridge having an ink container portion with an ink held therein, and an ink feeder for feeding the ink from the ink cartridge to the recording head, wherein-said ink is the ink as set forth in claim 1.

25. The ink-jet recording apparatus according to claim 24, wherein the recording head is a head which causes thermal energy to act on the ink to eject its droplets.

26. An ink comprising at least a recording agent, a liquid medium dissolving the recording agent therein and a compound having thermo-reversible gelation property, wherein the ink is in a homogeneous solution system at 25° C., and the compound having thermo-reversible gelation property separates out in the ink solution in a temperature range of from 30° C. to 65° C., so that the ink becomes a dispersion state, wherein the compound having thermo-reversible gelation property is water-soluble polyvinyl acetal.

27. An ink comprising at least a recording agent, a liquid medium dissolving the recording agent therein and a compound having thermo-reversible gelation property, wherein the ink is in a homogeneous solution system at 25° C., and the compound having thermo-reversible gelation property separates out in the ink solution in a temperature range of from 30° C. to 65° C., so that the ink becomes a dispersion state, wherein the compound having thermo-reversible gelation property is water-soluble hydroxypropyl cellulose.

* * * * *

UNITED STATES PATENT AND TRADEMARK OFFICE
CERTIFICATE OF CORRECTION

PATENT NO. : 5,439,515
DATED : August 8, 1995
INVENTOR(S) : YUTAKA KURABAYASHI, et al.

Page 1 of 2

It is certified that error appears in the above-indentified patent and that said Letters Patent is hereby corrected as shown below:

ON THE COVER PAGE

[56] References Cited

U.S. PATENT DOCUMENTS

"4,768,198 11/1988 Zgambo" should read
--4,786,198 11/1988 Zgambo--.
"4,798,399 12/1988 Williams et al." should read
--4,789,399 12/1988 Williams et al.--.

COLUMN 1

Line 34, "an" should read --a--.

COLUMN 7

Line 40, "an" should read --a--.

COLUMN 10

Line 41, "4" (second occurrence) should read --4:--.

UNITED STATES PATENT AND TRADEMARK OFFICE
CERTIFICATE OF CORRECTION

PATENT NO. : 5,439,515

DATED : August 8, 1995

INVENTOR(S) : YUTAKA KURABAYASHI, et al.

It is certified that error appears in the above-indentified patent and that said Letters Patent is hereby corrected as shown below:

COLUMN 18

Line 37, "wherein-said" should read --wherein said--.

Signed and Sealed this

Twenty-eighth Day of November 1995

Attest:

BRUCE LEHMAN

Attesting Officer     Commissioner of Patents and Trademarks